(No Model.)
J. R. ANDERSON.
MIRROR HANGER FOR BUREAUS, &c.
No. 434,632. Patented Aug. 19, 1890.
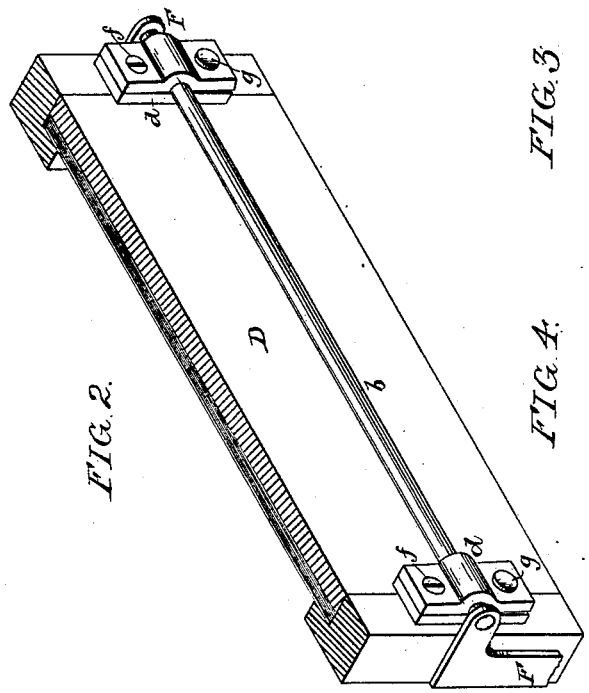
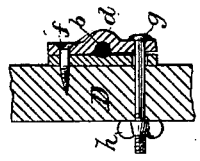
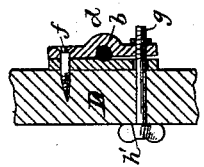
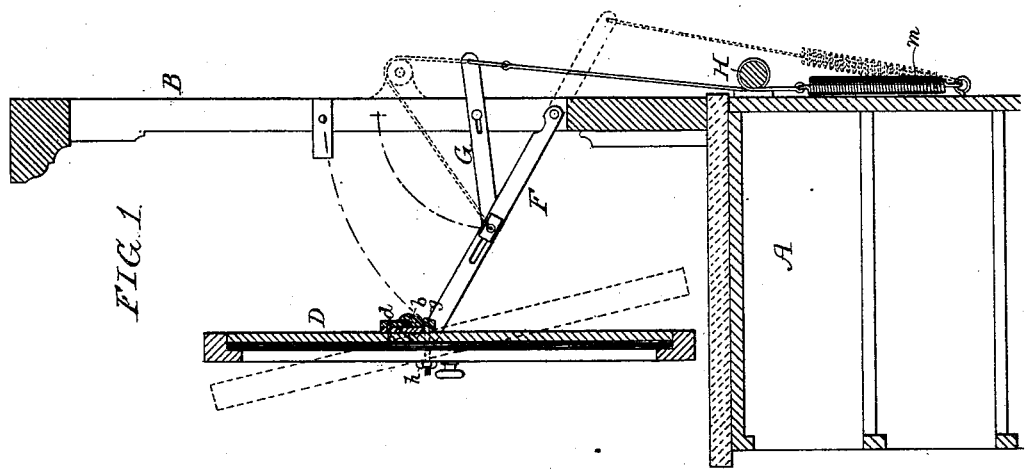
Witnesses
Murray C. Bayer
R. Schleicher
Inventor
Joseph R. Anderson
by his Attorneys
Howson & Howson

UNITED STATES PATENT OFFICE.

JOSEPH R. ANDERSON, OF PHILADELPHIA, PENNSYLVANIA, ASSIGNOR OF TWO-THIRDS TO FRANKLIN B. REEVES AND CHARLES HENRY REEVES, BOTH OF SAME PLACE.

MIRROR-HANGER FOR BUREAUS, &c.

SPECIFICATION forming part of Letters Patent No. 434,632, dated August 19, 1890.

Application filed September 16, 1889. Serial No. 324,078. (No model.)

*To all whom it may concern:*

Be it known that I, JOSEPH R. ANDERSON, a citizen of the United States, and a resident of Philadelphia, Pennsylvania, have invented certain Improvements in Mirror-Hangers for Bureaus, &c., of which the following is a specification.

One feature of my invention is an improvement upon mirror-hangers of the class of which that shown in my patent, No. 401,921, dated April 23, 1889, is an example, the object of this feature of the invention being to so hang the mirror to the supporting device that said mirror can be adjusted to and retained at any desired angle in respect to the vertical, in whatever position the hanging device may happen to be, a further object being to provide for readily regulating the tension upon the hinge-connection of a pivoted mirror. These objects I attain in the manner hereinafter set forth, reference being had to the accompanying drawings, in which—

Figure 1 is a transverse section of a bureau having a mirror-hanger illustrating my present invention. Fig. 2 is a perspective view, on a larger scale, of part of the mirror and of parts of the hanging arms for the same. Fig. 3 is a sectional view, on a still larger scale, illustrating one of the features of my invention; and Fig. 4 is a sectional view illustrating a modification.

So far as regards the general construction of the hanging device it may be similar to, or may be a modified form of, that constituting the subject of my patent, before referred to, the hanger shown in the drawings comprising an arm F, hung to the standard B of the bureau and acted upon by a lever G, also hung to the standard, and connected to a roller H, mounted at the back of the bureau and acted upon by a spring $m$, so as to tend to counterbalance the weight of the mirror and support the same, when it is drawn out from the standard B, to any desired extent.

Various modifications of the hanging device may, however, be adopted without departing from my present invention—for instance, the lever G may be dispensed with and the arm F may be extended rearward beyond its pivot, so as to transform said arm into a lever, the rear end of which may be acted upon by a spring, as shown by dotted lines in Fig. 1, or the arm F may be connected to a cord running over a pulley $a$ at the back of the standard and connected to a spring or to a spring-actuated drum H, as also shown by dotted lines in said figure.

My present invention relates to the means for hanging the mirror D to the outer ends of the arms F, the object being to so construct this device that it will permit of the adjustment of the mirror at any desired angle when it is drawn out from the frame or standard B, and will enable the hanging arms F to mutually brace or stiffen each other. With this object in view the outer ends of the arms F are connected by a rod $b$, secured to the arms and extending from end to end of the mirror D, to the back of which, preferably near each edge, are secured clamps $d$, which embrace the rod $b$ and serve as the means whereby the mirror is hung thereto.

Each clamp consists in the present instance of two plates connected at their upper ends by a screw $f$ to the mirror-frame and acted upon at their lower ends by a clamp-screw $g$, the plates being so shaped at or about the center as to partially embrace the rod $b$, so that by tightening the lower clamp-screw the two plates may be caused to bind upon said rod $b$ with any desired amount of friction, and the stiffness or slackness of the hinge-connection of the mirror may be thus regulated, as desired. The rod $b$, extending as it does from the outer or free end of one of the hanging arms to that of the opposite arm, serves as a transverse brace, whereby said arms mutually stiffen or strengthen each other, so that the mirror cannot be easily moved from side to side when drawn out from the frame, nor can it be twisted while it is being drawn forward, the outer ends of the hanging arms being compelled to move together.

The lower or clamping screw $g$ of each of the clamps $d$ extends through the frame of the mirror and projects some distance in front of the same, as shown in Fig. 3, this projecting portion of the screw being threaded for the reception of a thumb-nut $h$, so that the proper tightening or loosening of the clamps can be readily effected from the front of the mirror. The same object may, however, be attained by a reverse construction—that is to say, the clamping-screw may have a winged head $h'$, and may be adapted to a threaded opening in the clamp-plate, as shown, for instance, in Fig. 4. This feature of my invention is applicable also to mirror-hangers, in which pivot-pins at opposite ends of the mirror-frame take the place of the pivot-rod extending from end to end of the frame, as shown in the drawings.

Having thus described my invention, I claim and desire to secure by Letters Patent—

1. The combination of the frame of a bureau or like article of furniture, a mirror adapted to said frame, spring-supported hanger-arms for said mirror, a rod extending from end to end of the mirror-frame and connecting the outer or free ends of said hanger-arms, and friction-clamps engaging with said rod and secured to the mirror-frame, substantially as specified.

2. The combination of the mirror, the pivot-rod therefor, friction-clamps embracing said rod and carried by the back of the mirror-frame, and tightening-screws for said clamps extending through the mirror-frame and accessible from the front of the same, substantially as specified.

In testimony whereof I have signed my name to this specification in the presence of two subscribing witnesses.

JOSEPH R. ANDERSON.

Witnesses:
R. SCHLEICHER,
HARRY SMITH.